US006477594B1

(12) United States Patent
Tung

(10) Patent No.: US 6,477,594 B1
(45) Date of Patent: Nov. 5, 2002

(54) COMPUTER MONITOR WITH DUAL-PURPOSE CONTROL SWITCHES, AND METHOD FOR PROVIDING SCREEN-CONTROL SWITCHES ON A COMPUTER MONITOR WITH DIFFERENT FUNCTIONS

(75) Inventor: Chih-Chung Tung, Taichung Hsien (TW)

(73) Assignee: ADI Corporation, Tai-Ping (TW)

( * ) Notice: Subject to any disclaimer, the term of this patent is extended or adjusted under 35 U.S.C. 154(b) by 0 days.

(21) Appl. No.: 09/264,849

(22) Filed: Mar. 8, 1999

(51) Int. Cl.[7] ................................................ G06F 13/00
(52) U.S. Cl. ........................................ 710/104; 345/589
(58) Field of Search ............................ 710/104, 63, 73; 345/589, 156, 690

(56) References Cited

U.S. PATENT DOCUMENTS 5,457,784 A * 10/1995 Wells et al. ................ 395/829
5,963,652 A * 10/1999 Tran et al. .................. 381/109
6,076,133 A * 6/2000 Brainard et al. ............ 710/260
6,289,466 B1 * 9/2001 Bayramoglu et al. ....... 713/310
6,314,479 B1 * 11/2001 Frederick et al. ............. 710/63
6,320,576 B1 * 11/2001 Kim ........................... 345/214

* cited by examiner

*Primary Examiner*—Peter Wong
*Assistant Examiner*—X. Chung-Trans
(74) *Attorney, Agent, or Firm*—Christensen O'Connor Johnson Kindness PLLC

(57) ABSTRACT

A computer monitor includes a plurality of screen-control switches, an input/output circuit adapted to be connected to a computer, and a processor connected to the screen-control switches and the input/output circuit, and adapted to detect if a universal serial bus (USB) standard compliant-interface was established between the input/output circuit and the computer. The processor performs a hardware-based on-screen display routine to adjust screen characteristics of the computer monitor when the screen-control switches are operated and the USB standard compliant-interface is not detected. The processor generates a command that is assigned to an operated one of the screen-control switches and that is to be received by the computer via the USB standard compliant-interface when the USB standard compliant-interface is detected.

14 Claims, 3 Drawing Sheets

COMPUTER MONITOR WITH DUAL-PURPOSE CONTROL SWITCHES, AND METHOD FOR PROVIDING SCREEN-CONTROL SWITCHES ON A COMPUTER MONITOR WITH DIFFERENT FUNCTIONS

BACKGROUND OF THE INVENTION

1. Field of the Invention

The invention relates to a computer monitor, more particularly to a computer monitor having dual-purpose control switches, and to a method for providing screen-control switches on a computer monitor with different functions according to the presence (or absence) of a universal serial bus (USB) standard compliant-interface that is established with a computer.

2. Description of the Related Art

In one example of a conventional computer monitor, control knobs are provided to enable the user to adjust various characteristics, such as screen color and contrast, of the computer monitor. However, the adjustment as such relies only upon the eyes of the user and is unsuited for standardized adjustment.

Another example of a conventional computer monitor is capable of performing a hardware-based on-screen display (OSD) routine. With the use of screen-control switches on the computer monitor, the OSD routine can be initiated to enable the user to adjust the values of different screen characteristics that are shown on a screen of the computer monitor.

A further example of a conventional computer monitor is capable of establishing electrical connection with a personal computer via an interface that complies with the universal serial bus (USB) standard. By incorporating additional function keys on the computer monitor, control signals can be transmitted to the personal computer via the interface to expand the functionality of the computer monitor.

However, it is noted that the additional function keys on the computer monitor do not serve any purpose when the latter is used with a personal computer that does not support the USB standard. As such, manufacturers generally make two kinds of computer monitors, one supporting the USB standard, the other incapable of supporting the USB standard. This results in inconvenience during production and inventory management.

SUMMARY OF THE INVENTION

Therefore, the object of the present invention is to provide a computer monitor having screen-control switches that can be used to perform conventional screen characteristics adjustment under a normal operating mode, and to perform expanded control functions under a USB standard compliant-interface operating mode.

Another object of the present invention is to provide a method for providing screen-control switches on a computer monitor with different functions according to the presence (or absence) of a universal serial bus (USB) standard compliant-interface that is established with a computer.

According to one aspect of the invention, a computer monitor is adapted for use with a computer and comprises a plurality of screen-control switches, an input/output circuit adapted to be connected to the computer, and a processor connected to the screencontrol switches and the input/output circuit, and adapted to detect if a universal serial bus (USB) standard compliant-interface was established between the input/output circuit and the computer. The processor performs a hardware-based on-screen display routine to adjust screen characteristics of the computer monitor when the screen-control switches are operated and the USB standard compliant-interface is not detected. The processor generates a command that is assigned to an operated one of the screen-control switches and that is to be received by the computer via the USB standard compliant-interface when the USB standard compliant-interface is detected.

According to another aspect of the invention, a method for providing screen-control switches on a computer monitor with different functions, comprises:

- detecting if a universal serial bus (USB) standard compliant-interface was established between the computer monitor and a computer;
- when the USB standard compliant-interface is not detected, performing a hardware-based on-screen display routine internally of the computer monitor to adjust screen characteristics of the computer monitor when the screen-control switches are operated; and
- when the USB standard compliant-interface is detected, generating a command that is assigned to an operated one of the screen-control switches and that is to be received by the computer via the USB standard compliant-interface.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
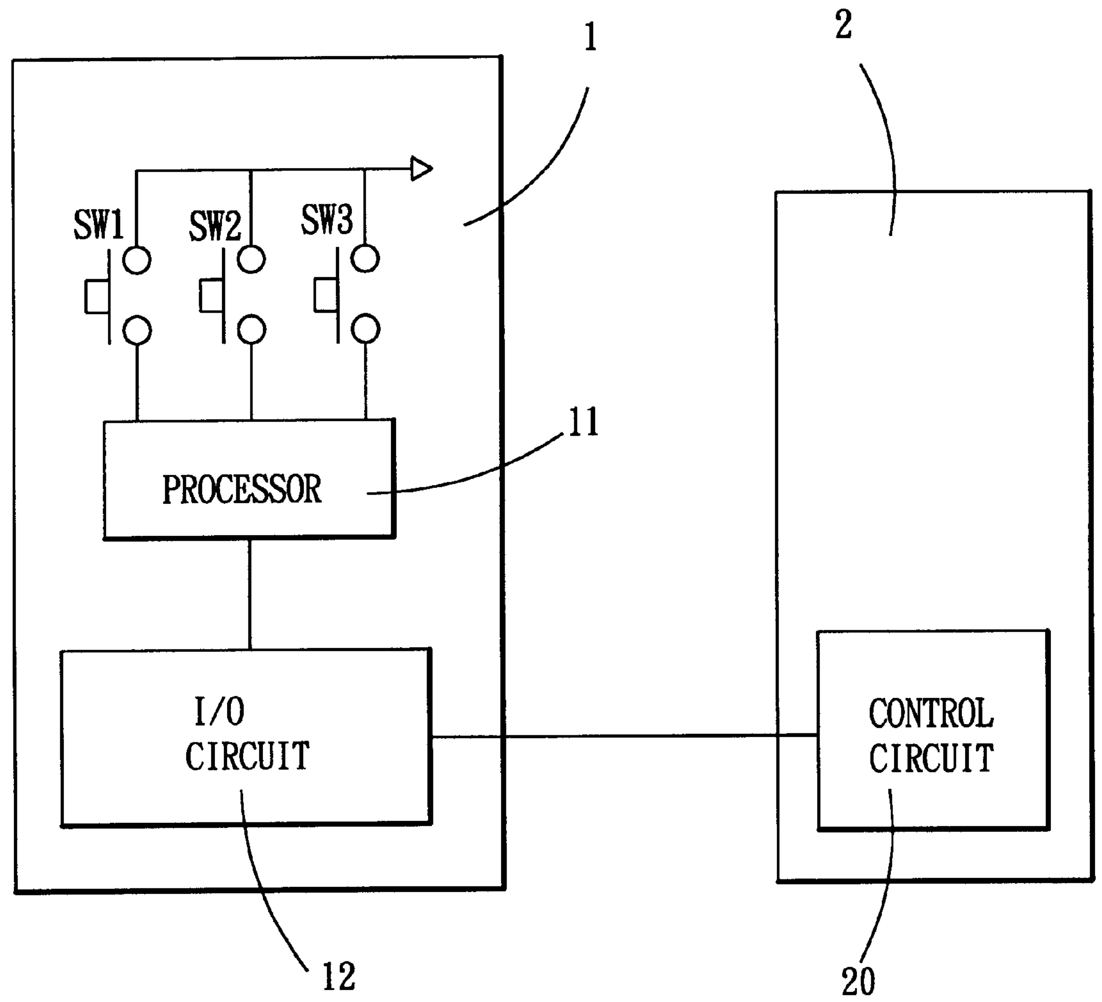
FIG. 1 is a schematic diagram illustrating the preferred embodiment of a computer monitor according to this invention when connected to a personal computer.

Referring to FIG. 1, the preferred embodiment of a computer monitor 1 according to the present invention is adapted to be used with a personal computer 2. The computer monitor 1 includes three screen-control switches SW1, SW2, SW3, such as a 'SELECT' switch, a '+' adjustment switch and a '−' adjustment switch. The screen-control switches SW1, SW2, SW3 are connected to a processor 11. The processor 11 is connected to an input/output (I/O) circuit 12. The I/O circuit 12 is capable of establishing a USB standard compliant interface with a control circuit 20 of the personal computer 2.

The processor 11 is capable of detecting if the USB standard compliant-interface was established between the I/O circuit 12 and the personal computer 2. In the event that no USB standard compliant-interface is established between the I/O circuit 12 and the control circuit 20, such as when the personal computer 2 does not support the USB standard or when the I/O circuit 12 is disabled from establishing the USB standard compliant-interface, the processor 20 operates under a normal operating mode, where a hardware-based on screen display (OSD) routine is performed by the processor 11 in a known manner for adjustment of the screen characteristics of the computer monitor 1 once the screen-control switches SWI, SW2, SW3 are operated. For example, if the screen-control switch SW1 is a 'SELECT' switch, the switch SW1 can be operated to initiate the hardware-based OSD routine and to select the screen characteristics that are to be adjusted. If the screen-control switches SW2, SW3 are a '+' adjustment switch and a '−' adjustment switch, respectively, the switches SW2, SW3 can be operated to move a select bar or to increase or decrease the values of the selected screen characteristics.

As to how the processor 11 determines which one of the screen-control switches SW1, SW2, SW3 was operated, this can be accomplished in a known manner by comparing input codes that arise due to the operation of the switches SW1, SW2, SW3 with preset codes stored in the processor 11.

In the event that a USB standard compliant-interface is established between the I/O circuit 12 and the control circuit 20, the processor 11 operates under a USB standard compliant-interface operating mode, where the processor 11 generates a preset command that is assigned to an operated one of the screen-control switches SW1, SW2, SW3 and that is to be received by the personal computer 2 via the USB standard compliant-interface. The commands that are generated by the processor 11 under this mode can be manufacturer-assigned or user-assigned. In this embodiment, the screen-control switches SW1, SW2, SW3 are associated with manufacturer-assigned default commands that can be modified by the user. For example, under the USB standard compliant-interface operating mode, the command that is generated during operation of the 'SELECT' switch SW1 can be one for initiating a software-based OSD routine to be performed by the personal computer 2 to enable adjustment of the screen characteristics of the computer monitor 1 under the supervision of the personal computer 2. The commands that are generated during operation of the '+' adjustment switch SW2 and the '−' adjustment switch SW3 can be manufacturer-assigned volume control commands or user-specified application programs to be performed by the personal computer 2. As to how commands and application programs are assigned by the user to the adjustment switches SW2, SW3, these will be described in the succeeding paragraphs.

Figure 2:
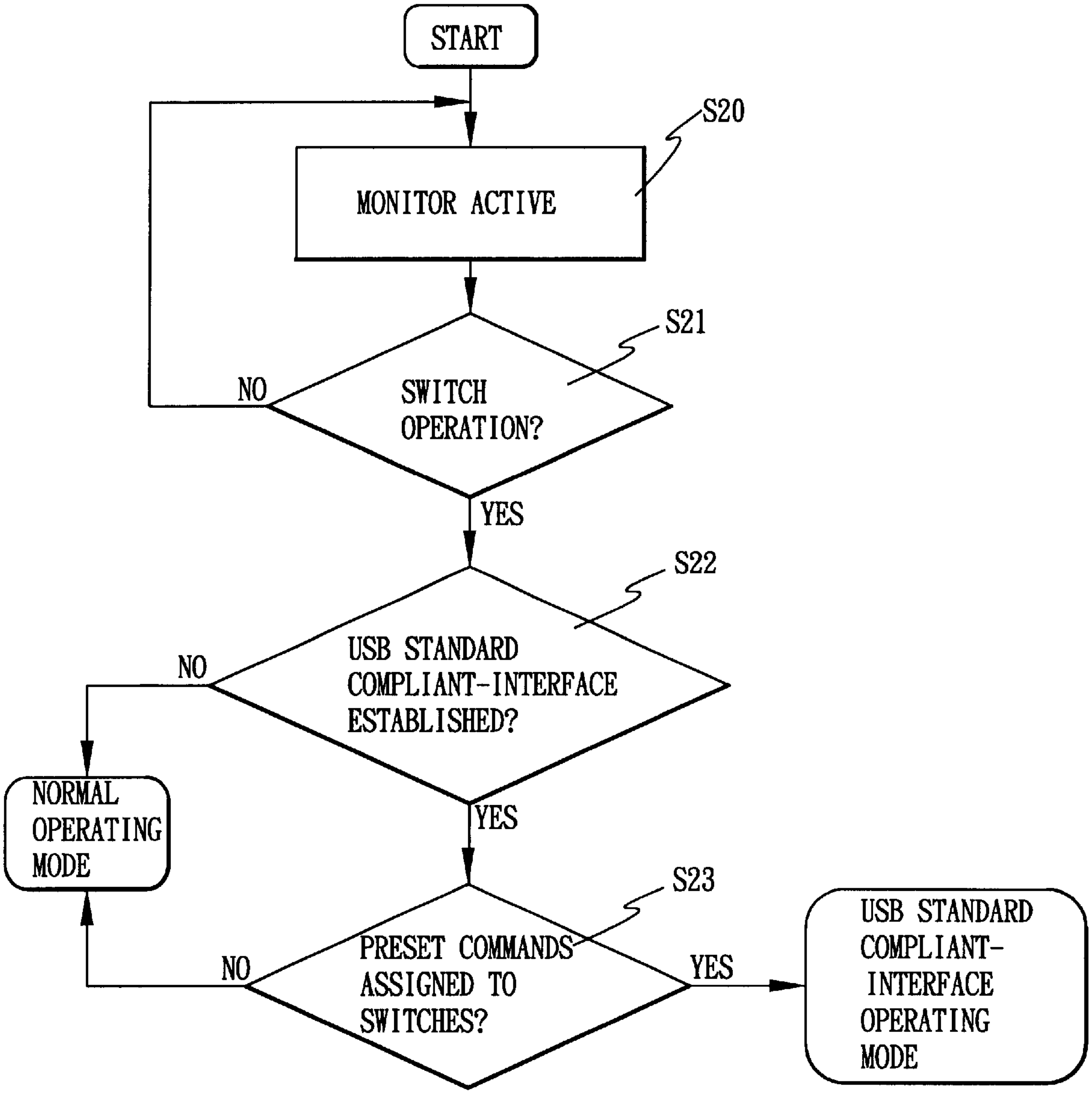
FIG. 2 is a flowchart illustrating the operation of the preferred embodiment when a screen-control switch thereof is operated.

FIG. 2 is a flowchart illustrating the operation of the computer monitor 2. After the computer monitor 1 is activated in step S20, the flow proceeds to step S21, where the processor 11 detects whether any of the screen-control switches SW1, SW2, SW3 is operated. When one of the switches SW1, SW2, SW3 is operated, the flow subsequently proceeds to step S22, where the processor 11 detects if the USB standard compliant-interface is established between the I/O circuit 12 and the control circuit 20 of the personal computer 2. If the USB standard compliant-interface is not established, the processor 11 operates under the normal operating mode, where the known hardware-based OSD routine is performed by the processor 11 for adjustment of the screen characteristics of the computer monitor 1 according to the operation of the screen-control switches SW1, SW2, SW3 in the manner described beforehand. If the USB standard compliant-interface is established, the flow proceeds to step S23, where the processor 11 determines if assigned preset commands are currently available for the switches SW1, SW2, SW3. If no, the processor 11 operates under the normal operating mode. Otherwise, the processor 11 operates under the USB standard compliant-interface operating mode.

Figure 3:
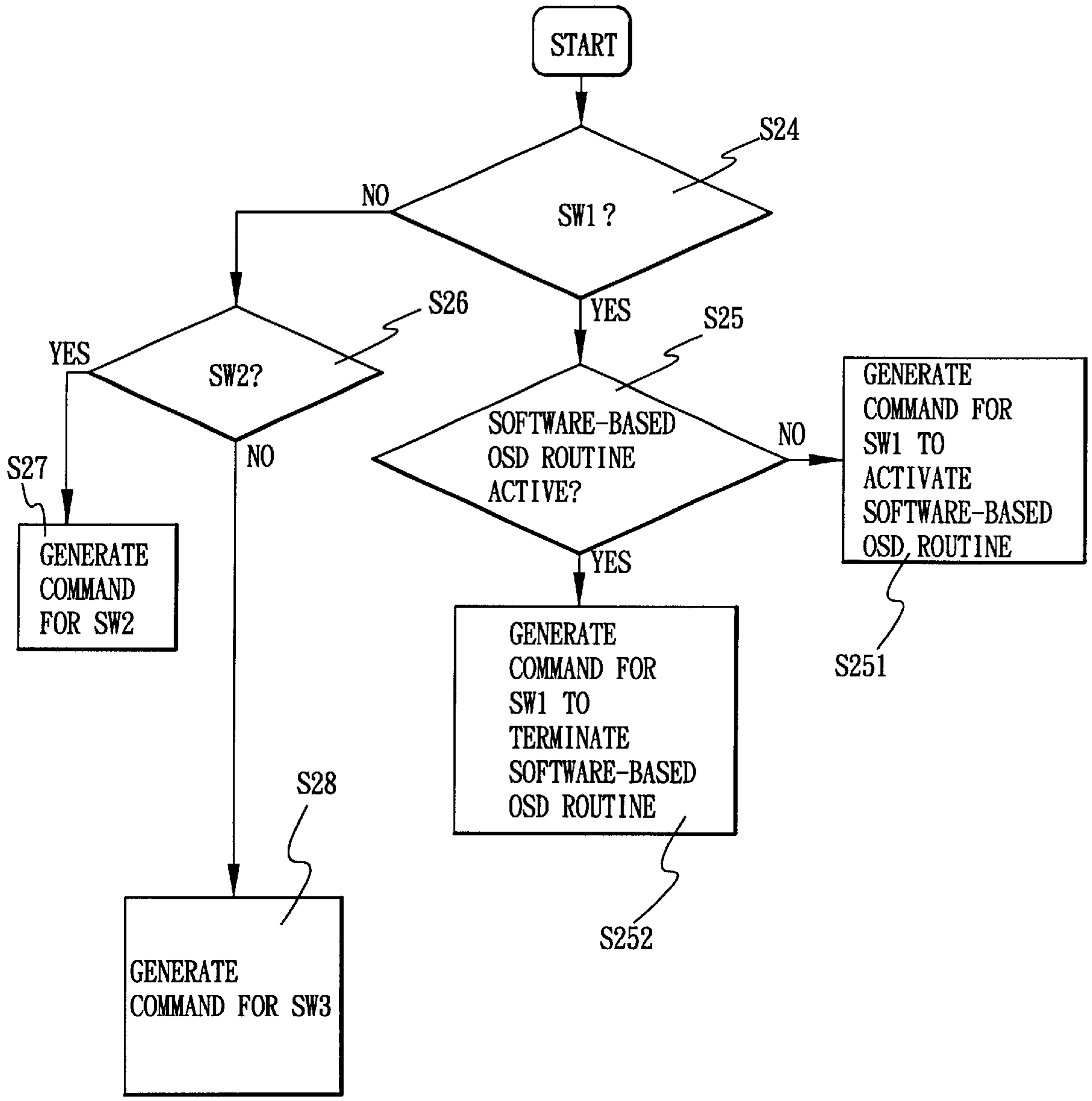
FIG. 3 is a flowchart illustrating the operation of the preferred embodiment under a USB standard compliant-interface operating mode.

FIG. 3 is a flowchart illustrating the operation of the preferred embodiment under the USB standard compliant-interface operating mode. In step S24, the processor 11 initially determines if the screen-control switch SW1 was operated. If yes, the flow proceeds to step S25, where the processor 11 determines if the software-based OSD routine is already initiated. If no, the flow proceeds to step S251, where the processor 11 generates the command that is assigned to the switch SW1, thereby initiating the software-based OSD routine that is performed by the personal computer 2 to enable adjustment of the screen characteristics of the computer monitor 1 under the supervision of the personal computer 2 and with the use of a computer mouse (not shown). If yes, the flow proceeds to step S252, where the processor 11 generates the command that is assigned to the switch SW1, thereby controlling the personal computer 2 to terminate the software-based OSD routine.

If it was determined in step S24 that the screen-control switch SW1 was not operated, the flow proceeds to step S26, where the processor 11 determines if the screen-control switch SW2 was operated. If yes, the flow proceeds to S27, where the processor 11 generates the command that is assigned to the switch SW2, thereby controlling the personal computer 2 to perform a corresponding manufacturer or user-specified application program. Otherwise, the flow proceeds to S28, where the processor 11 generates the command that is assigned to the switch SW3, thereby controlling the personal computer 2 to perform a corresponding manufacturer or user-specified application program.

Preferably, in order to enable the user to assign commands and application programs to the screencontrol switches SW2, SW3, the software associated with the computer monitor 2 gives the user the option of accomplishing the same when the software-based OSD routine is performed by the personal computer 1.

It is worthwhile to note that, under the USB standard compliant-interface operating mode, operation of either of the screen-control switches SW2, SW3 can result in direct control of the personal computer 1 to execute the application programs that are assigned thereto. In case the switches SW2, SW3 are assigned for volume control, operation of the switches SW2, SW3 can result in an increase or decrease in the sound output of a loudspeaker unit (not shown) that is connected to the personal computer 1.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A computer monitor adapted for use with a computer, comprising:

a plurality of screen-control switches, said screen-control switches including a select switch and at least one adjustment switch;

an input 1 out put circuit adapted to be connected to the computer; and a processor connected to said screen-control switches and said input/output circuit, and adapted to detect if a universal serial bus (USB) standard compliant-interface was established between said inputloutput circuit and the computer;

said processor performing a hardware-based on-screen display routine to adjust screen characteristics of the computer monitor when the screen-control switches are operated and the USB standard compliant-interface is not detected;

said processor generating a command that is assigned to an operated one of said screen-control switches and that is to be received by the computer via the USB standard compliant interface when the USB standard compliant-interface is detected.

2. The computer monitor of claim 1, wherein said select switch is operated to initiate the hardware-based on-screen display routine and to select the screen characteristics to be adjusted when the USB standard compliant-interface is not detected, and said adjustment switch is operated to adjust values of the selected screen characteristics when the USB standard compliant-interface is not detected.

3. The computer monitor of claim 2, wherein the commands that correspond to said screen-control switches, when the USB standard compliant-interface is detected, are manufacturer-assigned.

4. The computer monitor of claim 2, wherein the commands that correspond to said screen-control switches, when the USB standard compliant-interface is detected, are user-assigned.

5. The computer monitor of claim 2, wherein, when the USB standard compliant-interface is detected, the command that is generated during operation of said select switch is one for initiating a software-based on-screen display routine to be performed by the computer to enable adjustment of the screen characteristics of the computer monitor under supervision of the computer.

6. The computer monitor of claim 2, wherein, when the USB standard compliant-interface is detected, the command that is generated during operation of said adjustment switch is a volume control command.

7. The computer monitor of claim 2, wherein, when the USB standard compliant-interface is detected, the command that is generated during operation of said adjustment switch is a user-specified application program to be performed by the computer.

8. A method for providing screen-control switches on a computer monitor with different functions, the screen-control switches including a select switch and at least one adjustment switch, comprising:

detecting if a universal serial bus (USB) standard compliant-interface was established between the computer monitor and a computer;

when the USB standard compliant-interface is not detected, performing a hardware-based on-screen display routine internally of the computer monitor to adjust screen characteristics of the computer monitor when the screen-control switches are operated; and when the USB standard compliant-interface is detected, generating a command that is assigned to an operated one of the screen-control switches and that is to be received by the computer via the USB standard compliant-interface.

9. The method of claim 8, wherein the select switch is operated to initiate the hardware-based on-screen display routine and to-select the screen characteristics to be adjusted when the USB standard compliant-interface is not detected, and the adjustment switch is operated to adjust values of the selected screen characteristics when the USB standard compliant-interface is not detected.

10. The method of claim 9, wherein the commands that correspond to the screen-control switches, when the USB standard compliant-interface is detected, are manufacturer-assigned.

11. The method of claim 9, wherein the commands that correspond to the screen-control switches, when the USB standard compliant-interface is detected, are user assigned.

12. The method of Claim 9, wherein, when the USB standard compliant-interface is detected, the command that is generated during operation of the select switch is one for initiating a software-based on-screen display routine to be performed by the computer to enable adjustment of the screen characteristics of the computer monitor under supervision of the computer.

13. The method of claim 9, wherein, when the USB standard compliant-interface is detected, the command that is generated during operation of the adjustment switch is a volume control command.

14. The method of claim 9, wherein, when the USB standard compliant-interface is detected, the command that is generated during operation of the adjustment switch is a user-specified application program to be performed by the computer.

* * * * *